Patented June 24, 1930

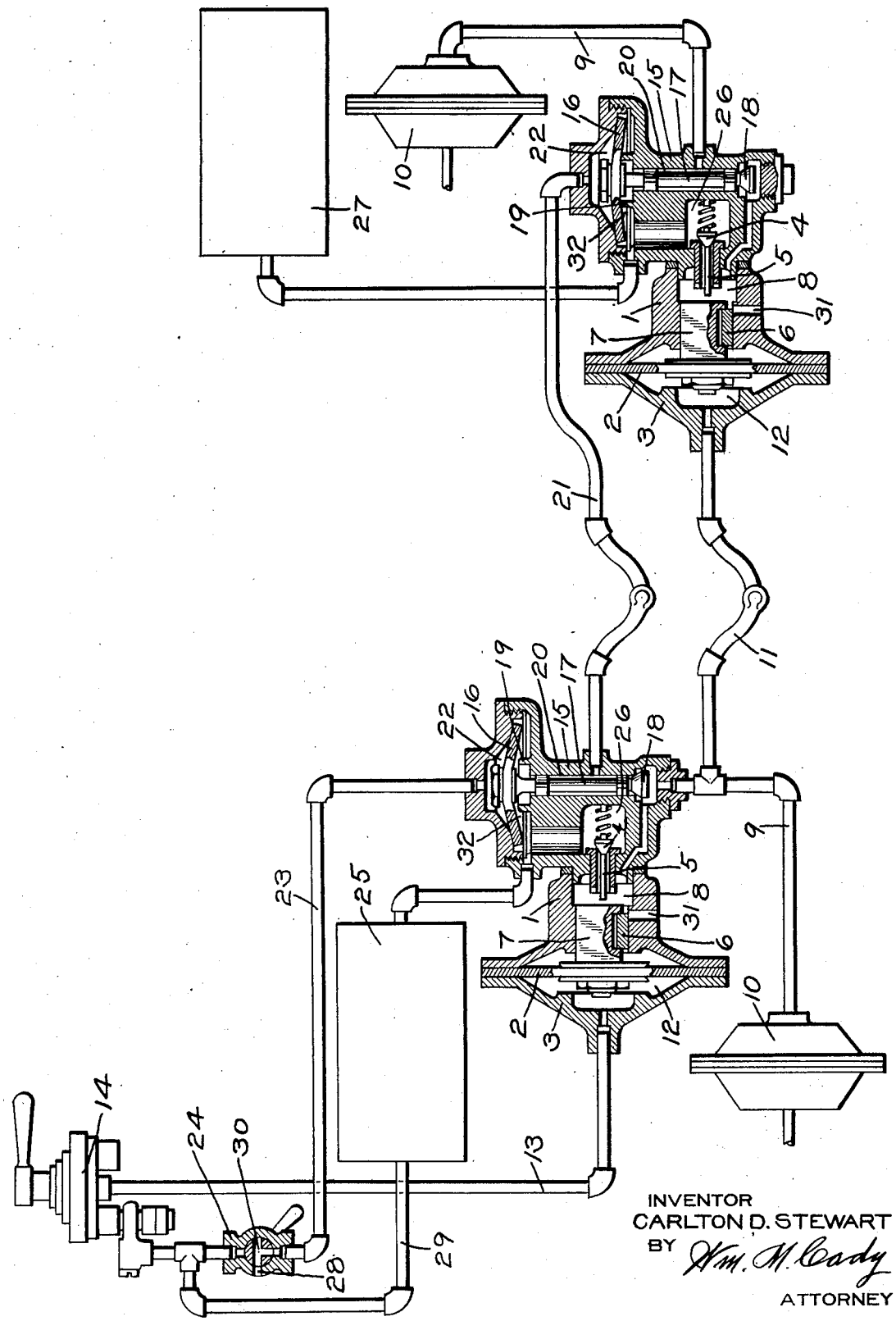

1,765,634

UNITED STATES PATENT OFFICE

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed October 18, 1928. Serial No. 313,295.

This invention relates to fluid pressure brakes, and more particularly to a fluid pressure brake for automotive service, where trailer vehicles are operated by motor trucks.

It has heretofore been proposed to provide a fluid pressure brake equipment for use on motor vehicles in which the brakes on the truck and the trailer may be manually controlled from the truck by straight air and in which the brakes are automatically applied when the trailer separates from the truck.

It sometimes happens that the straight air brake pipe parts, while the emergency brake pipe remains intact and in such cases, the operator loses control of the brakes since the straight air brake pipe is open and since he has no means for reducing the pressure in the emergency brake pipe.

The principal object of my invention is to provide means whereby the operator on the truck may effect a reduction in pressure in the emergency brake pipe, in case of necessity, so as to cause an emergency application of the brakes.

In the accompanying drawing, the single figure is a diagrammatic view, partly in section, of an automotive brake equipment for a truck and a trailer, and embodying my invention.

According to my invention, a combined emergency and service brake controlling valve device is provided on the truck and a similar valve device is provided on the trailer and comprising in each case, a flanged casing 1, a flexible diaphragm 2 clamped in position on the flange of the casing by a flanged cover plate 3, a service supply valve 4 having a stem 5, and a release valve 6, adapted to be operated by diaphragm 2 through a stem 7, the stem 7 being adapted to engage and operate the stem 5.

The valve chamber 8 of the valve device 1 on the truck is connected to pipe 9, leading to the truck brake cylinder 10 and pipe 9 is connected to a straight air brake pipe 11, leading to the diaphragm chamber 12 of the controlling valve device on the trailer.

The chamber 12 of the valve device on the truck is connected to the truck straight air pipe 13, which leads to a brake valve device 14. Associated with casing 1 is a casing 15, containing a flexible diaphragm 16 having a stem 17 carrying a valve 18 at its end. The periphery of the diaphragm 16 is free and when the diaphragm is depressed, it is adapted to engage a seat rib 19 and unseat the valve 18.

The chamber 20 surrounding the stem 17 of the truck valve device 15 is connected to an emergency brake pipe 21 which leads to the diaphragm chamber 22 of the valve device 15 on the trailer. The chamber 22 of the valve device 15 on the truck is connected to a pipe 23, which leads to a three way cock 24. On the truck, a main storage reservoir 25 is connected to valve chamber 26 and on the trailer, an auxiliary reservoir 27 is connected to the corresponding valve chamber 26.

The brake valve device 14 may be of any desired type capable of controlling the supply of fluid under pressure to and its release from the pipe 13 and the three way cock 24 is normally in the position shown in the drawing, in which cavity 30 connects pipe 23 with an exhaust port 28 and when the cock is turned, pipe 23 is connected to a supply pipe 29, leading to the main reservoir 25.

The pipe 23 being normally at atmospheric pressure, the main reservoir pressure supplied to diaphragm chamber 32 of the truck valve device 15 causes movement of the diaphragm 16 to its upper position, in which the diaphragm is unseated from the seat rib 19, permitting flow of fluid from the main reservoir to the chamber 20 and thence to the emergency brake pipe 21.

On the trailer, fluid supplied to the brake pipe 21 flows to diaphragm chamber 22 of the trailer valve device 15, and passes the free periphery of the diaphragm 16 to the diaphragm chamber 32, whence the auxiliary reservoir 27 is charged with fluid under pressure. On the trailer, the diaphragm 16 is held seated against the seat rib 19 by the fluid pressure in chamber 22, and the valve 18 is held unseated.

When a straight air application of the brakes is desired, the brake valve handle is turned to application position, in which fluid under pressure is supplied to pipe 13. The diaphragm 2 of the truck valve device 1 is then moved so as to cause the valve 6 to close the exhaust port 31 and then the stem 7 engages the stem 5 so as to unseat valve 11 and permit the flow of fluid from the main reservoir 25 to valve chamber 8 and thence to pipe 9 and the truck brake cylinder 10. Fluid also flows through the straight air brake pipe 11 to diaphragm chamber 12 of the valve device 1 on the trailer and thereby the diaphragm 2 is operated to effect the closure of the release valve 6 and the opening of the supply valve 4. On the trailer, fluid is then supplied from the auxiliary reservoir 27, past the valve 4 and also past the normally open valve 18 to the trailer brake cylinder 10.

If the straight air pipe 11 should part, so as to prevent the operator from effecting a straight air application of the brakes, or if for any other reason, he may effect an emergency application of the brakes by turning the cock 24, so as to connect the supply pipe 29 with pipe 23.

The diaphragm 16 of the truck valve device 15 is then moved downwardly, so as to cause the diaphragm to seat on the seat rib 19, and also cause the valve 18 to be unseated, so that the emergency brake pipe 21 is connected, past the open valve 18 either to the atmosphere, through the straight air brake pipe 11, if that pipe has parted, or by way of the exhaust port 31.

Fluid under pressure being thus vented from the emergency brake pipe 21, the diaphragm 16 of the trailer valve device 15 is moved up by the reservoir pressure acting in chamber 32, so that fluid under pressure is then supplied from the auxiliary reservoir 27 to chamber 20 and thence to the brake cylinder 10 on the trailer, the valve 18 being seated by this movement of the diaphragm.

It will thus be seen that by means of my invention, if the straight air pipe should break or part, without parting the emergency brake pipe, a brake application may still be obtained on the trailer. It will be understood that one or any number of trailers may be attached to the truck, the additional trailers being also connected to the emergency brake pipe 21 and the straight air brake pipe 11, and being equipped with the trailer brake apparatus, as shown in the drawing.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake apparatus for a truck and a trailer vehicle, the combination with an emergency brake pipe, of a brake cylinder, a valve device on the trailer operated upon a reduction in emergency reservoir pressure for supplying fluid under pressure to the brake cylinder, and a valve device on the truck operated upon an increase in fluid pressure for venting fluid under pressure from the emergency brake pipe.

2. In a fluid pressure brake apparatus for a truck and a trailer vehicle, the combination with an emergency brake pipe, of a brake cylinder, a valve device on the trailer operated upon a reduction in emergency brake pipe pressure for supplying fluid under pressure from a stored volume to the brake cylinder, a valve device on the truck operated upon an increase in fluid pressure for venting fluid from the emergency brake pipe, and a manually operated valve for controlling the fluid pressure on said valve device.

3. In a fluid pressure brake apparatus for a truck and trailer, the combination with an emergency brake pipe, a brake cylinder on the truck, and a brake cylinder on the trailer, of a valve device on the truck operated by an increase in fluid pressure for supplying fluid to the truck brake cylinder, a valve device on the trailer operated by an increase in fluid pressure for supplying fluid to the trailer brake cylinder, a train pipe connecting the truck brake cylinder to the trailer valve device, a valve device on the trailer operated upon a reduction in emergency brake pipe pressure for supplying fluid to the trailer brake cylinder, and a valve device on the truck operated by an increase in fluid pressure for venting fluid from the emergency brake pipe.

4. In a fluid pressure brake apparatus for a truck and trailer, the combination with an emergency brake pipe, a brake cylinder on the truck, and a brake cylinder on the trailer, of a valve device on the truck operated by an increase in fluid pressure for supplying fluid to the truck brake cylinder, a brake valve device for controlling the fluid pressure on the first mentioned valve device, a valve device on the trailer operated by fluid pressure in the truck brake cylinder for supplying fluid under pressure to the trailer brake cylinder, a valve device on the trailer operated upon a reduction in pressure in the emergency brake pipe for supplying fluid under pressure to the trailer brake cylinder, a valve device on the truck operated by an increase in fluid pressure for venting fluid from the emergency brake pipe, and a manually operable valve on the truck for supplying fluid under pressure to the last mentioned valve device.

In testimony whereof I have hereunto set my hand, this 8th day of October, 1928.

CARLTON D. STEWART.